(12) United States Patent
Padovani et al.

(10) Patent No.: US 9,874,430 B2
(45) Date of Patent: Jan. 23, 2018

(54) TOUCH PROBE AND RELATIVE CIRCUITS AND METHODS FOR SIGNAL PROCESSING

(71) Applicant: Marposs Societa' Per Azioni, Bentivoglio (BO) (IT)

(72) Inventors: Roberto Padovani, Minerbio (IT); Daniele Dondi, San Giovanni in Persiceto (IT)

(73) Assignee: Marposs Societa' Per Azioni, Bentivoglio (bo) (IT)

( * ) Notice: Subject to any disclaimer, the term of this patent is extended or adjusted under 35 U.S.C. 154(b) by 131 days.

(21) Appl. No.: 14/908,788

(22) PCT Filed: Jul. 30, 2014

(86) PCT No.: PCT/EP2014/066407
§ 371 (c)(1),
(2) Date: Jan. 29, 2016

(87) PCT Pub. No.: WO2015/014901
PCT Pub. Date: Feb. 5, 2015

(65) Prior Publication Data
US 2016/0169656 A1    Jun. 16, 2016

(30) Foreign Application Priority Data

Aug. 1, 2013   (IT) .............................. BO2013A0426

(51) Int. Cl.
*G01B 7/00*       (2006.01)
*G01B 7/012*      (2006.01)
(Continued)

(52) U.S. Cl.
CPC ............. *G01B 7/012* (2013.01); *G01B 5/012* (2013.01); *G01B 21/047* (2013.01)

(58) Field of Classification Search
CPC ........ G01B 5/008; G01B 7/012; G01B 21/04; G01B 11/03; G01B 5/012; G01B 5/016; G01B 21/047
(Continued)

(56) References Cited

U.S. PATENT DOCUMENTS

| 4,153,998 A | 5/1979 | McMurtry |
| 4,815,214 A | 3/1989 | Enderle et al. |

(Continued)

FOREIGN PATENT DOCUMENTS

| CN | 101687298 (A) | 3/2010 |
| EP | 0 254 903 A2 | 2/1988 |

(Continued)

*Primary Examiner* — Yaritza Guadalupe-McCall
(74) *Attorney, Agent, or Firm* — Blank Rome LLP; Mark J. Thronson; Tara L. Marcus (57) ABSTRACT

A probe (100) comprises a frame (2), a movable armset (3) and a processing circuit (30; 30') for processing signals. The processing circuit is able to individually detect the state of contacts (13) defined by the cooperation between mechanical elements of the armset and mechanical elements of the frame, that is the closing or opening of the contacts, and provide a signal indicative of a rest position of the probe when it detects no more than one open contact. A method for processing signals uses said circuit in order to provide a signal indicative of a rest position of the probe. The circuit and the method for processing signals are advantageously implemented for processing the output signals of a touch probe adapted to check dimensions or position of a workpiece in coordinate measuring machines and machine tools.

14 Claims, 4 Drawing Sheets

(51) Int. Cl.
*G01B 21/04* (2006.01)
*G01B 5/012* (2006.01)

(58) Field of Classification Search
USPC .......................................................... 33/503
See application file for complete search history.

(56) References Cited

U.S. PATENT DOCUMENTS

| | | | |
|---|---|---|---|
| 4,972,594 | A | 11/1990 | Gurny et al. |
| 5,090,131 | A | 2/1992 | Deer |
| 5,319,858 | A | 6/1994 | Coy |
| 9,494,614 | B2 * | 11/2016 | Passini ...................... G01P 3/38 |
| 2008/0083128 | A1 * | 4/2008 | O'Connor .............. B23Q 1/012 |
| | | | 33/503 |
| 2010/0269362 | A1 * | 10/2010 | Bos ...................... G01B 5/0002 |
| | | | 33/503 |
| 2013/0205609 | A1 * | 8/2013 | Gambini ................ G01B 5/016 |
| | | | 33/561 |
| 2016/0169656 | A1 * | 6/2016 | Padovani ............. G01B 21/047 |
| | | | 33/503 |

FOREIGN PATENT DOCUMENTS

| | | |
|---|---|---|
| EP | 0 501 681 A1 | 9/1992 |
| WO | WO 92/09862 | 6/1992 |
| WO | WO 03/021182 A1 | 3/2003 |
| WO | WO-2012055868 (A2) | 5/2012 |

* cited by examiner

TOUCH PROBE AND RELATIVE CIRCUITS AND METHODS FOR SIGNAL PROCESSING

TECHNICAL FIELD

The present invention relates to a touch probe for checking position and/or dimensions of a workpiece, comprising a support and protective frame with a rest and locating area, an armset that is movable with respect to and partly housed in the support and protective frame, comprising an arm carrying a feeler adapted to touch the workpiece to be checked, a thrust device adapted to urge the armset against the rest and locating area, a constraint and positioning system, arranged between the armset and the support and protective frame at the rest and locating area, comprising a rest system with reference mechanical stops and contacts that are closed when mechanical elements of the armset cooperate with mechanical elements of the support and protective frame, the reference mechanical stops being adapted to define a rest position of the touch probe, and a processing circuit adapted to detect the state of the contacts and to provide a signal indicative of the rest position when all the contacts are closed.

The invention also relates to a method for processing a signal that is output by a touch probe for checking position and/or dimensions of a workpiece, comprising a support and protective frame, an armset that is movable with respect to and partly housed in the support and protective frame, a rest system with reference mechanical stops and contacts that are closed when mechanical elements of the armset cooperate with mechanical elements of the support and protective frame, the reference mechanical stops being adapted to define a rest position of the touch probe, a processing circuit for detecting the state of the contacts and providing a signal indicative of the rest position when all the contacts are closed.

PRIOR ART

Touch probes are electromechanical tools widely used in coordinate measuring machines and machine tools, particularly machining centers and lathes, for checking workpieces, machined or to be machined, tools, machine tables, etc.

As described for example in U.S. Pat. No. 4,153,998A, such probes generally include a support structure or frame, and an armset that is movable with respect to the frame and comprises an arm carrying a feeler adapted to touch the workpiece to be checked. In particular, the armset is coupled to the frame at reference mechanical stops between elements made of conductive material that define pairs of electrical contacts typically in series, being part of an electric circuit.

When the probe lies in rest position, the armset is coupled to the frame at all the reference mechanical stops under the thrust of a spring. The opening and closing of the electrical contacts are detected by checking, for example, variations in resistance across these contacts. When the feeler touches the workpiece, an external force acts in opposition to the thrust of the spring on the armset, causing the gradual release of the latter with respect to the frame in correspondence of at least one contact. The value of resistance across one or more contacts progressively increases until exceeding a determined threshold, giving rise to an output signal indicative of the probe moving away from the rest position, as a consequence of the touch between the feeler and the workpiece to be checked. In touch probes, in order that the checking is repeatable and reliable, it is important that, as the touch between the feeler and the workpiece ceases, the probe returns to its rest position.

This requirement is also present in probes wherein the touch between the feeler and the workpiece is detected by sensors of different types, for example piezoelectric sensors or strain gauges which emit a signal indicative of the total force applied to the probe. In this case, the coupling between armset and frame and the corresponding electric circuit can be used as auxiliary devices for detecting whether or not there actually has been a contact between the feeler and the workpiece, and consequently the probe, respectively, does not stand in the rest position or it does. In more detail, as the sensors are not always able to transmit information about the state of the system and in particular about the deflection of the armset with respect to the frame, for example at the time that immediately follows the emission of the signal, said coupling and the relative electric circuit can be used to derive such information. A probe of this type is described in the international patent application published under number WO2012055866.

In the touch probes so far mentioned, particularly if used for repeatedly checking, the problem of incorrectly signaling the return of the probe in the rest position may arise in practice. In particular, as the touch between the feeler and the workpiece ceases, when the armset is coupled again to the frame at the reference mechanical stops under the thrust of the spring, the rest position may not be correctly restored and/or signaled, for example due to the fact that the resistance value detected in correspondence of at least one contact is not back below the determined threshold.

A circuit and a method that intend to partially solve this problem are described in the European patent application published under number EP0501681A1. The application refers to a probe that includes an electrical circuit for signal processing comprising active components, for instance transistors, and a method for checking which comprises a step of cleaning the contacts. However, among the main disadvantages of this known technique, there are an increase in the response time of the probe due to delays introduced by the switching time of the active components and the further step of cleaning the contacts, and the risk of damaging the surface of the contacts due to the high currents that may flow in the circuit.

More complex solutions give indication of the armset arrangement when the probe is not operational. For example, according to the solution presented in U.S. Pat. No. 5,090,131A, each reference mechanical stop is equipped with strain gauges, which measure in all directions the deviations of the armset with respect to a predetermined reference position so that these deviations are taken into account in the later check. This known technique, however, requires complex circuits, that are expensive and in most cases difficult to manufacture.

DISCLOSURE OF THE INVENTION

Object of the present invention is to realize a touch probe for checking position and/or dimensions of a workpiece, and a method for processing a signal, for example a signal that is output by a touch probe adapted to check position or dimensions of a workpiece in coordinate measuring machines or machine tools, said touch probe and method being free from the previously described inconveniences and, concurrently, easily and cheaply implemented.

According to the present invention, this and other objects are achieved by a touch probe and a method for signal processing according to claim 1 and claim 8, respectively, which form an integral part of the present description.

Objects and advantages of the present invention will be clear from the detailed description that follows, concerning a preferred embodiment of the invention, given only by way of non-restrictive example, with reference to the attached drawings.

BRIEF DESCRIPTION OF THE DRAWINGS

The present invention is now described with reference to the attached sheets of drawings, given by way of non-limiting examples, wherein.

BEST MODES FOR CARRYING OUT THE INVENTION

Figure 1:
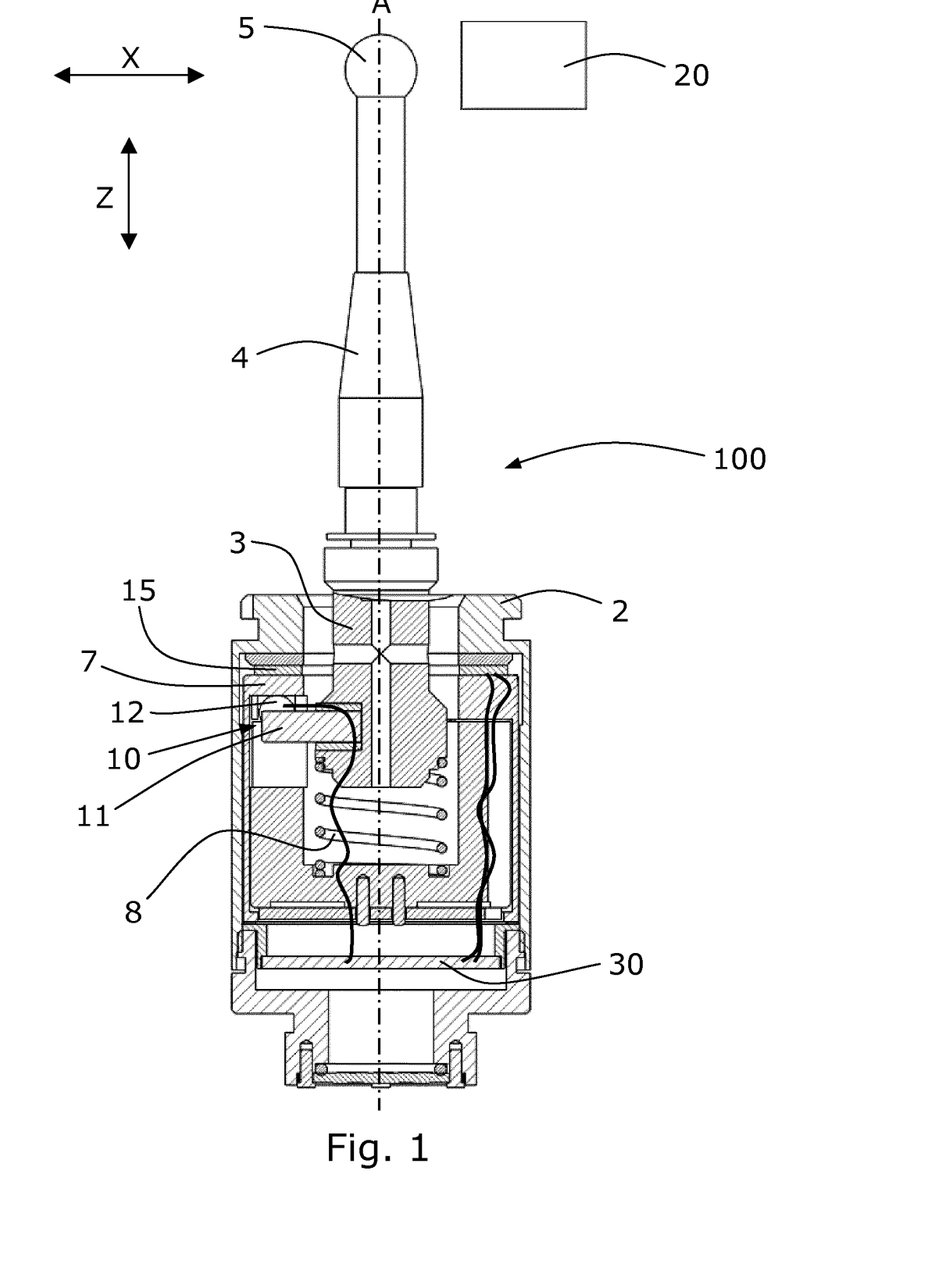
FIG. 1 is a schematic view of a longitudinal section of a touch probe according to the present invention.

FIG. 1 shows in a schematic way the section of a touch probe 100 for checking position and/or dimensions of a workpiece 20. In a preferred embodiment of the invention, the probe 100 includes, for example, a support and protective structure or frame 2 that defines a longitudinal axis A, and an armset 3 that is movable with respect to and partly housed in the frame 2. The armset 3 comprises an arm 4 carrying a feeler 5 adapted to touch the workpiece 20 to be checked. A thrust device with a compression spring 8 is placed between the frame 2 and the armset 3, and urges the latter against a rest and locating area 7 of the frame 2.

A constraint and positioning system is arranged between the armset 3 and the frame 2, at the rest and locating area 7. Said constraint and positioning system comprises a rest system with reference mechanical stops 10 defined by the cooperation of mechanical elements of the armset 3 with further mechanical elements of the frame 2, ideally arranged in a circular way and equidistant from one another. For example, the rest system may be isostatic with three reference mechanical stops 10, each of which is defined by two spheres 12—only one of them is visible in FIG. 1 —, fixed to the frame 2 and adapted to define a V-shaped seat, and by a radial element 11 with cylindrical shape that is part of the armset 3. The spheres 12 and the radial element 11 are entirely made, otherwise at least partially covered, by conductor or semiconductor material, in general characterized by a predetermined conductivity inside a given range of values. Each radial element 11 can separately cooperate with each of two spheres 12 at an ideally point area or contact 13 (FIG. 2), for instance an electrical contact.

At the rest and locating area 7, the probe 100 includes also a detection system 15, separate from the contacts 13, comprising for example at least a laminar piezoelectric element or transducer connected to the frame 2 and substantially arranged on a plane perpendicular with respect to the longitudinal axis A. The laminar piezoelectric transducer has the capability of converting the compression or decompression events it is subjected to in electrical signals indicative of the force variation it undergoes. The detection system 15 with the laminar piezoelectric transducer transmits to a processing circuit 30 control signals that are processed and used in a way known per se for checking, as mentioned above, position and/or dimensions of the workpiece 20. More details about a touch probe with a laminar piezoelectric transducer are described in the already cited international patent application published under number WO2012055866.

Processing electronics are located within the support structure 2 and include the processing circuit 30, which both the spheres 12 and the detection system 15 are connected to by means of electrical conductors represented by connections drown with thick line.

Figure 3:
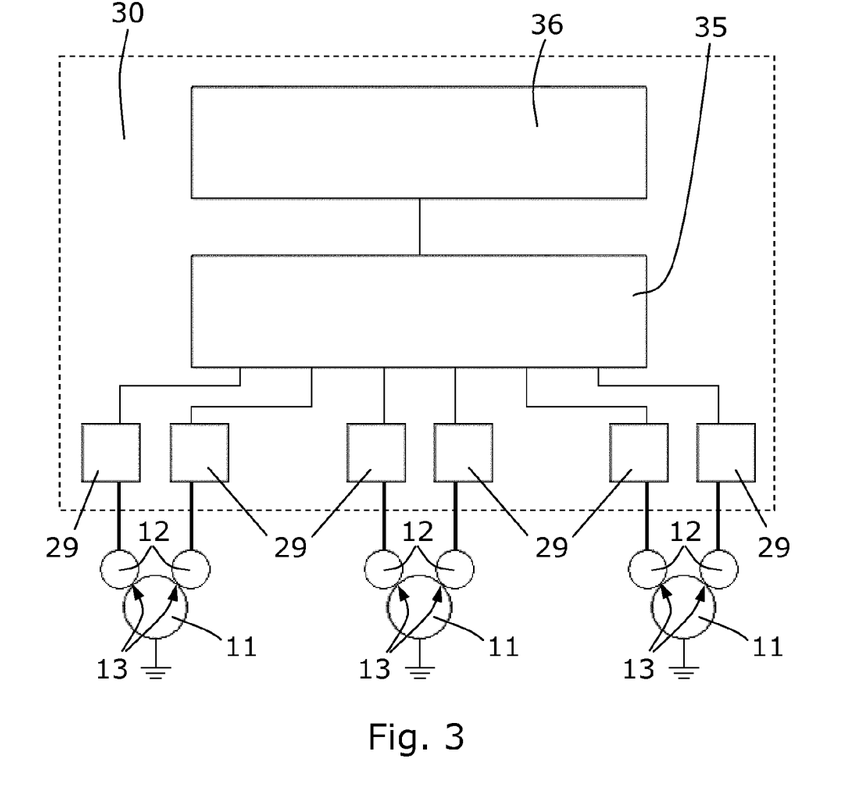
FIG. 3 is a schematic circuit block diagram of a signal processing system in a touch probe according to a preferred embodiment of the invention.

In a preferred embodiment of the invention, as schematically illustrated in FIG. 3, all the radial elements 11 are connected to a known potential, usually null, and each sphere 12 is connected for instance to a conditioning unit 29 of the processing circuit 30. The contacts 13, which are six in the illustrated example, to be more precise the circuit branches each comprising a contact 13 defined by one radial element 11 and one of the two spheres 12 which such radial element 11 cooperates with, and one conditioning unit 29, are advantageously connected together in parallel. In such a way the processing circuit 30 is able to detect individually the state of each of the six contacts 13, in other words whether each single contact 13 is closed or open. The processing circuit 30 includes also an analog/digital converter 35 and a microcontroller 36. The latter is adapted, amongst other things, to process both control signals transmitted by the detection system 15 for the correct emission of the signal indicative of the total force variation, and the signals about the state of the spheres 12, for instance the potential of each of them, that give indication about the number of closed contacts 13, namely the mutual position between the armset 3 and the rest and locating area 7 of the frame 2.

Figure 4:
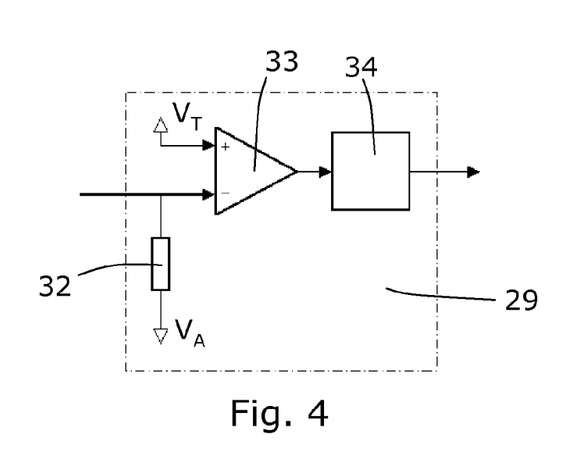
FIG. 4 is a schematic circuit block diagram of a signal conditioning unit within said processing system.

In order to better illustrate the processing circuit of a touch probe according to the present invention and a corresponding processing method, FIG. 4 shows some of the main components of a schematic circuit block diagram of only one conditioning unit 29, such diagram being the same for the others. The potential associated to the sphere 12, the latter being not visible in FIG. 4, is given by a voltage divider between a bias resistance 32 connected to a supply voltage $V_A$, and a contact resistance associated to the contact 13 between the sphere 12 and the radial element 11 it cooperates with.

The voltage divider generates, according to a known operating principle, a potential that is transmitted to a comparator 33, the threshold thereof is fixed to a reference value $V_T$, preferably programmable, which produces a signal representative of the state of the corresponding contact 13. When the contact 13 is closed, in theory the resistance across it is null, the input potential of the comparator 33 is null and its output potential is high, usually equal to the supply voltage of said comparator 33. When the contact 13 is substantially open as the radial element 11 moved away from the sphere it rests on, in theory the resistance is infinite (in practice, greater than a determined value), the input potential of the comparator 33 corresponds to that of the voltage generator $V_A$ and its output potential is low, for instance equal to zero. The conditioning unit 29 comprises also a signal adjusting circuit 34, connected to the comparator 33 and designated for example for filtering and amplifying the signal.

The output potentials of the signal adjusting circuits 34, each conveniently converted in digital number through the analog/digital converter 35, are processed by the microcontroller 36 in order to have an indication about the number of closed contacts 13 and provide, on the basis of such indication, a signal indicative of the probe 100 rest position.

A method for signal processing according to the present invention is described in the following.

Figure 2:
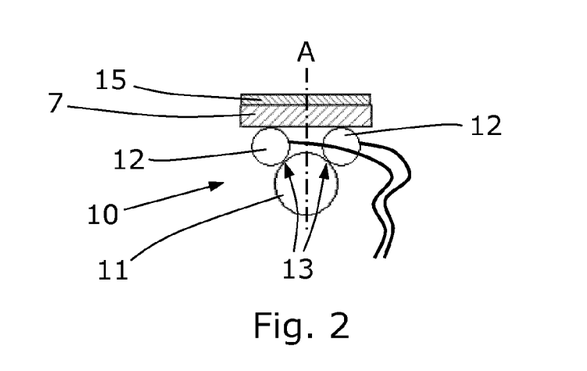
FIG. 2 illustrates in a schematic way an enlarged longitudinal section of a component of the touch probe according to the present invention.

When the probe 100 lies in the initial rest position, that is in the absence of touch between the feeler 5 and the workpiece 20 to be checked, under the action of the spring 8, the three radial elements 11 are placed in the V-shaped seats realized by the spheres 12, and the reference mechanical stops 10, therefore the position of the armset 3 with respect to the frame 2, are univocally defined. As it is shown in FIG. 2, that illustrates in a schematic way the transversal section of one of the reference mechanical stops 10 in such initial rest position, each radial element 11 touches both the spheres 12 that define the V-shaped seat it is located in, closing the corresponding six contacts 13. All the six comparators 33 have null input potential and transmit a potential equal to their supply voltage to the corresponding signal adjusting circuits 34. The output signals of the signal adjusting circuits 34 are converted each in a digital number and suitably combined by the analog/digital converter 35, then transmitted to the microcontroller 36, that processes them and provides a signal indicative of said initial rest position.

Following mutual movements between the probe 100 and the workpiece 20 to be checked, for instance along a transversal direction indicated with a double arrow X in FIG. 1, the feeler 5 touches the workpiece 20, and the latter applies a force to the armset 3 that is transmitted to the constraint and positioning system. The rest and locating area 7 is then subjected to compression or decompression events detected by the piezoelectric transducer of the detection system 15, that converts them in control signals indicative of the force variation to be transmitted to the microcontroller 36 in order to process and emit both the stop control of said mutual movements and the signal indicative of the total force variation. In correspondence of at least one of the three reference mechanical stops 10, a thrust action of the radial element 11 on the corresponding couple of spheres 12 also occurs, as well as a simultaneous action of releasing the thrust applied by the spring 8 at the other two—or the other one—reference mechanical stops 10 with consequent opening of one or more contacts 13. Consistently, as the input potential of the comparators 33 corresponding to one or more open contacts 13 is changed, such comparators 33 individually have null output potentials that, suitably adjusted by the signal adjusting circuit 34, combined and digitalized by the analog/digital converter 35, signal to the microcontroller 36 that the cooperation fails at said one or more open contacts 13 or, in other words, that said one or more contacts 13 are open. The microcontroller 36 processes such signals and detects the touch occurred between the feeler 5 and the workpiece 20, that is an operating status of the probe 100.

The same result is given by mutual movements along directions other than X, for instance along a direction Z, and following touch between the feeler 5 and the workpiece to be checked 20, after which a release action in correspondence, at least theoretically, of all the three reference mechanical stops 10 occurs, with consequent opening of the six contacts 13 and decompression in the laminar piezoelectric transducer.

At the end of the checking and following mutual movements between the probe 100 and the workpiece 20, for instance in mutually opposed senses along the transversal direction X, the contact between the feeler 5 and the workpiece 20 is released and the probe 100 returns in the rest position defined by the reference mechanical stops 10. Said position, wherein, at least theoretically, compression and decompression events detectable by the piezoelectric transducer do not occur in the rest and locating area 7 and the cooperation is present at said contacts 13, that is the six contacts 13 are all closed, is detected by the processing circuit 30 on the basis of the signals received from said contacts 13. Experimental tests performed by the applicant of the present application proved that it is not infrequent a situation wherein, even though the rest position is correctly restored from a mechanical point of view, the presence of the cooperation at all the contacts 13 is not signaled from an electrical point of view, in other words it is not signaled that all the six contacts 13 are closed. On the basis of said experimental tests, in particular, the rest position can be considered fully restored from a mechanical point of view not only when it is detected that all the six contacts 13 are closed, but also when it is detected that only one of said six contacts 13 is not proven to be closed, namely when it is detected that five of the six contacts 13 are closed. The signaling relative to the closing of the sixth contact 13 may not occur, for instance, because of a partial wear of the relative reference mechanical stop 10, or of an electrical malfunctioning due to the oxidation or to the deposit of a thin layer of oil (generally present inside the probe) between the sphere 12 and the radial element 11 that define said sixth contact 13.

According to the preferred embodiment illustrated in FIG. 1 and FIG. 3, the rest position and the operating status of the probe 100 are detected by the processing electronics on the basis of the signals received from the contacts 13. In particular, in a method for signal processing according to the present invention, the microcontroller 36 processes a signal indicative of the operating status of the probe 100 when, following the touch between the probe 100 and the workpiece 20 to be checked and the relative movement of the armset 3 with respect to the frame 2, the cooperation is not present in correspondence of at least two of the six contacts 13, or, in other words, at least two of the six contacts 13 are proven to be open, that is when the output potential of at least two of the six comparators 33 is null. As the touch ceases, indeed, at the moment when at least five contacts 13 are closed again, the corresponding at least five comparators 33 have null input potentials and output potentials equal to their supply voltage that, suitably adjusted by means of the signal adjusting circuit 34, digitalized and combined by the analog/digital converter 35, are transmitted to the microcontroller 36. The microcontroller 36 receives the signaling of the cooperation in correspondence of at least five contacts 13 as input signal, that is it receives the indication that at least five contacts 13 are closed, and provides, on the basis of such indication, a signal indicative of the rest position of the probe 100.

Variations to the method and the circuit for signal conditioning as described hitherto may be made without departing from the scope of the invention.

For example, the V-shaped seats and the radial elements 11 may be part of the armset 3 and of the support frame 2, respectively, or the constraint and positioning system may be realized in a different manner, for instance with a different isostatic system such as the one known as Kelvin coupling.

As an alternative to the laminar piezoelectric transducer, the probe 100 may include detection devices of different nature and disposition, comprising various types of piezo-resistive transducers or pressure transducers.

It is to be noted that when the contact 13 is closed and, at least theoretically, the resistance across it is equal to zero, the input potential of the comparator 33 is equal to a known voltage different from zero.

Alternatively, the conditioning unit 29 and the analog/digital converter 35 may be realized within the microcontroller 36.

In a different embodiment of the processing electronics, the analog/digital converter 35 may be removed and the conditioning unit 29 may be modified, for instance by including appropriately sized resistors in the signal adjusting circuit 34 so as the values of resistance are equal or in scale with each others, and connecting the modified conditioning units 29 to each other in order that, considered as a whole, they act as a single voltage divider which takes input potentials associated with all the spheres 12 and provides a signal representative of the number of the closed contacts 13. In particular, said voltage divider, the working principles thereof are known, is characterized by a voltage ratio which varies depending on the number of co-operations present between the mechanical components of the armset 3 and the mechanical components of the frame 2, i.e. the number of open or closed contacts 13, and generates an indication of the number of open otherwise closed contacts 13.

In a different embodiment of the invention, the microcontroller 36, that processes the output potentials of the comparators 33 in order to emit a signal indicative of the total force variation, may be substituted with logic gates or programmable logic units, for instance FPGA.

Advantageously, the circuits and the method described hitherto enable the compensation the intrinsic limits of the detection system 15 related to the information about the position of the probe 100, for example after the emission of the signal indicative of the total force variation, when the detection system 15, as already said, may be not able to transmit information about the displacement of the armset 3 with respect to the frame 2. The circuits described hitherto may be also advantageously used when the mutual movements between the probe 100 and the workpiece 20 are relatively slow and, even though they effectively cause the touch between the workpiece 20 and the feeler 5, the laminar piezoelectric transducer emits a signal with magnitude less than that necessary for the microcontroller 36 to detect the touch occurred, then process and emit the stop control of the mutual movements and the signal indicative of the total force variation. Therefore, the probe 100 not only would fail the checking of the workpiece 20, but it also would run the risk of being subjected to excessive mechanical stresses and/or breaks because of the undue continuation of said mutual movements instead of stopping as they should do after the occurred touch and the so-called overstroke of the feeler 5. According to the present invention, the described problems are overcome by a touch probe including the above-described separate electrical circuit comprising the contacts 13, adapted to transmit signals indicative of the mutual position between the armset 3 and the frame 2 at the rest and locating areas 7.

In addition, the methods and the circuits of the touch probes object of the present invention allow to obtain excellent results with simple, solid and compact components.

Figure 6:
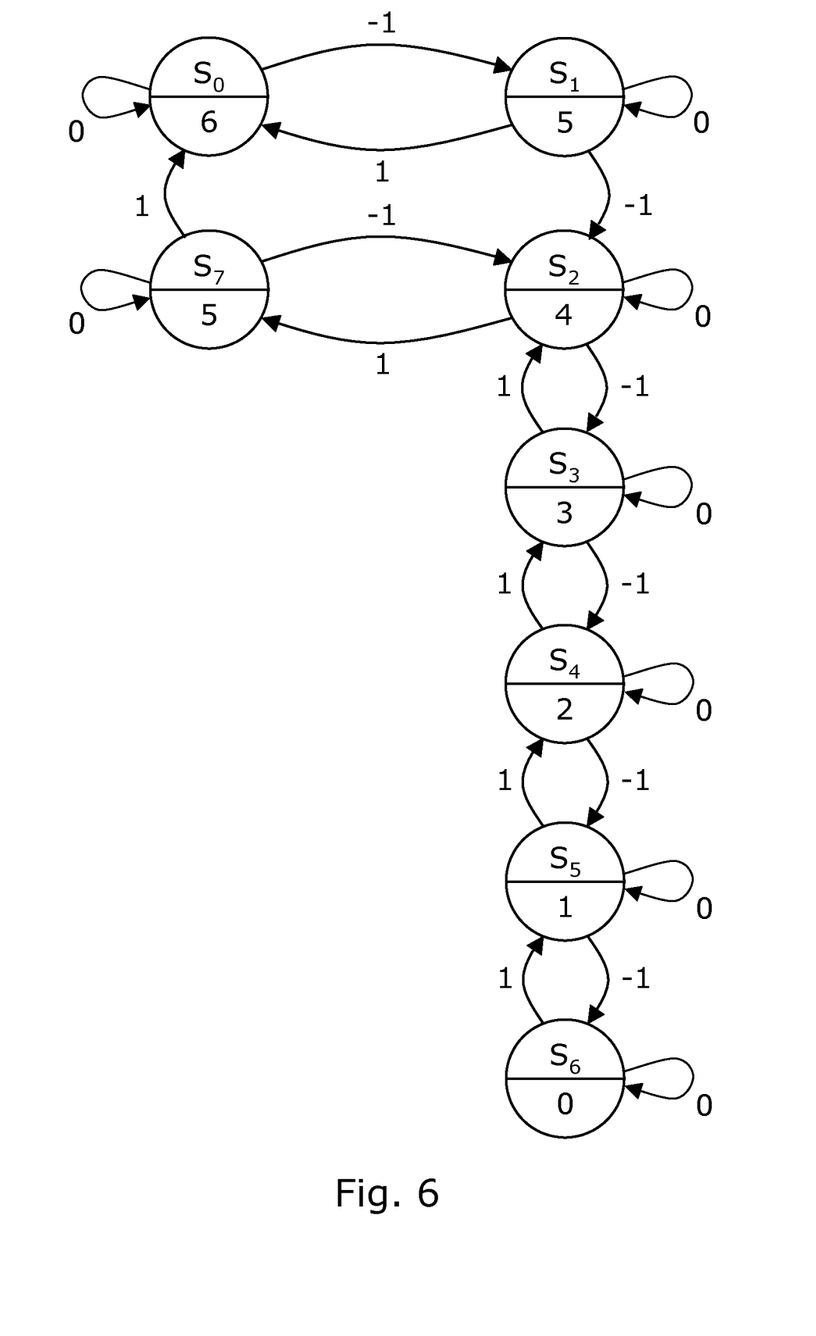
FIG. 6 illustrates a finite state machine implemented by the processing electronics according to a different embodiment of the invention.

Other possible methods for signal processing according to the present invention may be obtained by using the processing electronics in order to implement a finite state machine, for example a Mealy machine, as illustrated in FIG. 6, that individually and asymmetrically evaluates the presence of the cooperation at the contacts 13, in other words the opening or closing of the contacts 13, for processing the signal indicative of the probe 100 rest position. As it is well known to someone of ordinary skill in the art, the Mealy machine has finite states characterized by output values, for instance the number of closed contacts 13, determined both by current state and current input value, for instance the opening −1 or closing 1 of the contacts 13. For each pair of state and input value, a single transition is possible, generally represented by an arrow from the current state to the future state. The states and the transitions of the Mealy machine according to the present invention are described in the following.

The initial state is, for example, a state $S_0$ characterized by six closed contacts 13, wherein the probe 100 lies in the already mentioned initial rest position. Following mutual movements between the probe 100 and the workpiece 20 to be checked that determine the displacement of the armset 3 with respect to the frame 2, the already mentioned compression and decompression events occur in the rest and locating area 7, as well as the variation in resistance so in potential at the involved contacts 13. In this case, as soon as the microcontroller 36 receives the signaling of the failing cooperation at one of the contacts 13, that is at the opening −1 of just one contact 13, the microcontroller 36 is able to detect the touch occurred between the feeler 5 and the workpiece 20, provide a signal indicative of the fact that the probe 100 moved away from the rest position and emit the stop control of said mutual movements. Accordingly, the current state of the probe 100 is a state $S_1$ characterized by five closed contacts 13 and only one open contact 13, corresponding to a position other than the rest position, indicative of an operating status of the probe 100. Starting from this state $S_1$, the probe 100 may alternatively assume two different future states determined by the closing 1 of the only one open contact 13 or by the opening −1 of at least one of said five closed contacts 13, respectively.

In the first case, the only one open contact 13 closes again, for instance as the initial touch with the workpiece 20 to be checked ceases, and the microcontroller 36 receives a signaling which indicates that the probe 100 moved in a rest position with current state $S_0$ characterized by all the six contacts 13 closed. Therefore, the probe 100 shows, for this characteristic, a behavior similar to that of the known ones, for example the one shown in the already mentioned international patent application published under number WO2012055866.

In the second case, at least one of the five closed contacts 13 opens, for example because of the progress of the mutual movements between the probe 100 and the workpiece 20. The microcontroller 36 receives the signaling of at least a further opening −1, which reveals that the probe 100 holds in the operating status, in a current state $S_2$ or $S_3$ or $S_4$ or $S_5$ or $S_6$ characterized by no more than four closed contacts 13, that is at least two open contacts 13. In more detail, further opening −1 of the five closed contacts 13, one per time, determines as much transitions to future states, in order $S_2$, $S_3$, $S_4$, $S_5$ and $S_6$, characterized by a number of closed contacts 13 progressively decreased by one, the last state $S_6$ being characterized by no closed contacts 13, that is six open contacts 13. Starting from the state $S_6$, if, for instance, the mutual movements between the probe 100 and the workpiece 20 reverse, the six open contacts 13 close presumably one per time. The closing 1 of four of the six open contacts 13, one after one, determines as much transitions from the current state $S_6$ characterized by no closed contacts 13 to the future states, in order $S_5$, $S_4$, $S_3$ and $S_2$, characterized by a number of closed contacts 13 progressively increased by one, the state $S_2$, as already said, being characterized by four closed contacts 13, that is two open contacts 13. When one of the two open contacts 13 closes, that is five contacts 13 are proven to be closed, the microcontroller 36 receives the signaling of said closing 1 and, on the basis of said signaling, according to the present invention, provides a signal indicative of the fact that the probe 100 is back in the rest position though one of the six contacts 13 is proven to be open, in a state $S_7$ characterized by five closed contacts 13 Starting from this latest state $S_7$, indicative of the rest position, there are again two possibilities: at the opening of at least a second contact 13 the probe 100 returns to the previous operating status with current states characterized by at least two open contacts 13. Alternatively, at the closing of the only one open contact 13 the probe 100 holds the rest position with the current state $S_0$ characterized by six closed contacts 13.

For further information, FIG. 6 shows also that the invariance 0 of the contacts 13, that is contacts 13 do not open nor close, irrespective of the current state, always determines the permanence in the latter, that is the future state corresponds to the current state.

In view of a greater computational complexity of the processing electronics 30, this alternative method for signal processing according to the present invention exhibits new advantages in addition to the already cited advantages of the preferred method, for example because it features a definitely reduced pre-stroke. Also for this reason, the signaling of the opening and closing of the contacts 13 can be used not only to have information about the rest position or the operating status of the probe 100, but also as an alternative to the control signals transmitted by the detection system 15 in order to signal the touch occurred between the feeler 5 and the workpiece 20. On this regard it is to be noted that, while the probe 100 uses anyway the control signal transmitted by the detection system 15 in order to detect the touch occurred between the feeler 5 and the workpiece 20 on account of the better performance that can be achieved with the piezoelectric transducer, as far as the much faster response time and the isotropic behavior are concerned, a different probe can be provided, such probe using the above mentioned alternative method for signal processing according to the present invention and not needing the piezoelectric transducer, and in general a separate detection system.

Figure 5:
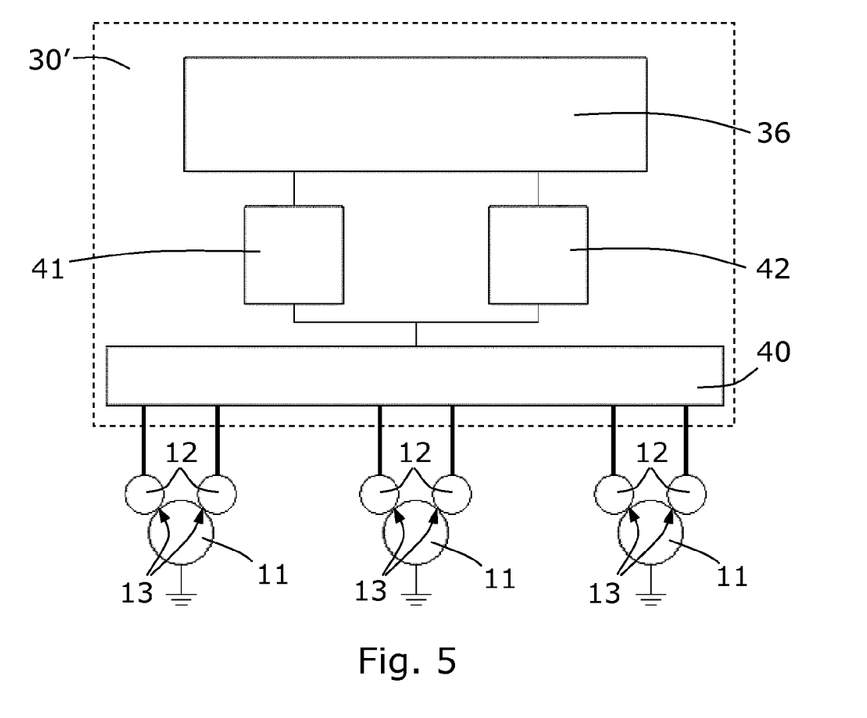
FIG. 5 is a schematic circuit block diagram of a signal processing system in a touch probe according to a different embodiment of the invention.

A further different embodiment according to the present invention comprises a different processing circuit 30', as FIG. 5 shows, also able to individually detect the state of each of said contacts 13. The processing circuit 30' includes the only one voltage divider, already mentioned and with known operating principle, referred to with reference 40 in FIG. 5. The voltage divider 40 is connected in cascade to both a pulse generator or trigger 42, adapted to detect the opening of one of the contacts 13 starting from a state wherein all the contacts 13 are closed and generate a corresponding pulse signal, and a threshold comparator 41, adapted to generate a two-level output signal, one level is indicative of the failing cooperation in correspondence of at least two contacts 13, that is of a state wherein at least two contacts 13 are open, the other level is indicative of the failing cooperation at no more than one contact 13, that is of a state wherein no more than one contact 13 is open (in the illustrated example, at least five contacts 13 are closed). In particular, as only one of the six closed contacts 13 opens, the trigger 42 generates a corresponding pulse signal indicative of said opening, whereas, as one of the five closed contacts 13 opens while only one contact 13 is already open, or, otherwise, as only one of the two open contacts 13 closes while the other four contacts 13 are closed, the output signal of the threshold comparator 41 shifts from one level to the other. The output signals of the threshold comparator 41 and the trigger 42 are transmitted to the microcontroller 36. This further different embodiment considers that the microcontroller 36 uses the signals received from the threshold comparator 41 (two-level output signal) and the trigger 42 (pulse signal) in order to process the signal indicative of the rest position of the probe 100, according to a method for signal processing similar to that implemented by the finite state machine previously described, that asymmetrically considers the presence of the cooperation at the contacts 13, that is the opening and the closing of the contacts 13. In particular, the microcontroller 36 detects the probe 100 moved away from the rest position when, at the opening of a first contact 13, it receives the pulse signal indicative of said opening from the trigger 42.

In case the only one open contact 13 closes again, for example as the initial touch between the feeler 5 and the workpiece 20 to be checked ceases, the trigger 42 does not transmit any signal to the microcontroller 36. The failure of such transmission, however, does not compromise the correct processing of the control signals received by the microcontroller 36 from the detection system 15 for precisely emitting the signal indicative of the total force variation.

In case, instead, one of the five closed contacts 13 opens, for example because of the progress of the mutual movements between the probe 100 and the workpiece 20, the output signal of the threshold comparator 41 opportunely goes to the level indicative of the failing cooperation in correspondence of at least two contacts 13, that is of the fact that at least two contacts 13 are open, and the microcontroller 36 keeps detecting that the probe 100 is in the operating status. When the closed contacts 13 switch from four to five, for example as a consequence of reversing the mutual movements between the probe 100 and the workpiece 20, the output signal of the threshold comparator 41 opportunely goes to the level indicative of the failing cooperation at no more than one contact 13, that is of the fact that at least five contacts 13 are closed, and the microcontroller 36 processes the received signals, so it detects and signals that the probe 100 lies in the rest position. Starting from said rest position, the microcontroller 36 detects and signals a new operating status if one of the five closed contacts 13 opens and the output signal of the threshold comparator 41 goes again to the level indicative of the failing cooperation in correspondence of at least two contacts 13, that is of the state wherein at least two contacts 13 are open. A new operating status is detected and signaled by the microcontroller 36 even when, after the single contact 13 is closed, one of the six closed contacts 13 opens thereafter, and the trigger 42 generates the corresponding pulse signal indicative of said new operating status.

The probe with this circuit and the relative alternative method for signal processing according to the present invention show new advantages in addition to those already mentioned for the preferred embodiment. As the previously described finite state machine, this embodiment too is characterized by a reduced pre-stroke, but, unlike said finite state machine, it shows the further advantage of having a lower production cost. Moreover, the circuit occupies less space inside the probe 100. In addition, this alternative embodiment can use the signaling obtained on the basis of the opening and closing of the contacts 13 in order to also signal the touch occurred between the feeler 5 and the workpiece 20 in probes wherein a separate detection system 15 is not present.

The invention claimed is:

1. A touch probe for checking position and/or dimensions of a workpiece, comprising
   a support and protective frame with a rest and locating area,
   an armset that is movable with respect to and partly housed in the support and protective frame, comprising an arm carrying a feeler adapted to touch the workpiece to be checked,
   a thrust device adapted to urge the armset against the rest and locating area,
   a constraint and positioning system arranged between the armset and the support and protective frame at the rest and locating area, comprising a rest system with reference mechanical stops and contacts that are closed when mechanical elements of the armset cooperate with mechanical elements of the support and protective frame, the reference mechanical stops being adapted to define a rest position of the touch probe, and
   a processing circuit adapted to detect the state of the contacts and to provide a signal indicative of said rest position when all the contacts are closed, wherein
   the processing circuit is able to individually detect the state of each of said contacts,
   the processing circuit is adapted to provide said signal indicative of the rest position even when it detects that one of said contacts is not closed.

2. The touch probe according to claim 1, wherein said contacts are electrical contacts.

3. The touch probe according to claim 1, wherein each of said contacts is comprised in a circuital branch of the processing circuit and said circuital branches are connected in parallel.

4. The touch probe according to claim 1, wherein the processing circuit comprises a voltage divider adapted to provide a signal representative of the number of closed contacts.

5. The touch probe according to claim 4, wherein the processing circuit comprises a pulse generator and a threshold comparator, both connected to said voltage divider, the pulse generator being adapted to detect the opening of one contact starting from a state wherein all the contacts are closed and to generate a pulsed signal, the comparator being adapted to generate a two level output signal, one level being indicative of a state wherein at least two of said contacts are open, the other level being indicative of a state wherein no more than one contact is open, said pulsed signal and two level output signal being used to process the signal indicative of the rest position.

6. The touch probe according to claim 1, comprising, at the rest and locating area, a detection system adapted to provide a control signal.

7. The touch probe according to claim 6, wherein said detection system comprises at least one piezoelectric transducer.

8. A method for processing a signal that is output by a touch probe for checking position and/or dimensions of a workpiece, comprising a support and protective frame, an armset that is movable with respect to and partly housed in the support and protective frame, a rest system with reference mechanical stops and contacts that are closed when mechanical elements of the armset cooperate with mechanical elements of the support and protective frame, the reference mechanical stops being adapted to define a rest position of the touch probe, a processing circuit for detecting the state of the contacts and providing a signal indicative of said rest position when all the contacts are closed, the method comprising the following steps:
   individually detecting the state of each of the contacts by means of the processing circuit, and
   providing said signal indicative of the rest position by means of the processing circuit even when the processing circuit detects that one of said contacts is not closed.

9. The method according to claim 8, comprising the step of detecting the number of the closed contacts.

10. The method according to claim 9, wherein said contacts of the touch probe are six and said signal indicative of the rest position is provided when five closed contacts are detected.

11. The method according to claim 8, wherein
   a pulsed signal is generated when, starting from a state wherein all the contacts are closed, the opening of one contact is detected, and
   a two-level output signal is generated, one level being indicative of a state wherein at least two of said contacts are open, the other level being indicative of a state wherein no more than one contact is open,
   said pulsed signal and two-level output signal being used to process the signal indicative of the rest position.

12. The method according to claim 8, comprising the further step of providing control signals to the processing circuit, and processing the control signals for said checking position and/or dimensions of the workpiece.

13. The method according to claim 12, wherein the control signals are provided by means of a detection system separate from said contacts.

14. The method according to claim 8, wherein the signal indicative of the rest position is provided when, starting from a state wherein one or two contacts are open, and pursuant to mutual movements between the armset and the support and protective frame, it is detected that one of such one or two contacts is closed.

* * * * *